(12) United States Patent
Dieziger (10) Patent No.: US 7,943,051 B2
(45) Date of Patent: May 17, 2011

(54) PORTABLE SETTLING AND DEWATERING TANK

(76) Inventor: David Douglas Dieziger, Missoula, MT (US)

( * ) Notice: Subject to any disclaimer, the term of this patent is extended or adjusted under 35 U.S.C. 154(b) by 0 days.

(21) Appl. No.: 12/644,639

(22) Filed: Dec. 22, 2009

(65) Prior Publication Data

US 2010/0206817 A1    Aug. 19, 2010

Related U.S. Application Data

(60) Provisional application No. 61/153,501, filed on Feb. 18, 2009.

(51) Int. Cl.
*B01D 37/00* (2006.01)
*B01D 21/02* (2006.01)
*B01D 21/24* (2006.01)
*B01D 29/25* (2006.01)

(52) U.S. Cl. ........ 210/767; 210/804; 210/807; 210/241; 210/265; 210/291; 210/248

(58) Field of Classification Search .......................... None
See application file for complete search history.

(56) References Cited

U.S. PATENT DOCUMENTS

| 748,230 | A | | 12/1903 | Stout | |
|---|---|---|---|---|---|
| 1,166,713 | A | | 1/1916 | Otterson | |
| 1,295,056 | A | | 2/1919 | Otterson | |
| 1,331,239 | A | * | 2/1920 | Cartwright | 210/241 |
| 1,331,900 | A | * | 2/1920 | Cartwright | 210/408 |
| 2,649,965 | A | * | 8/1953 | King et al. | 210/241 |
| 3,159,420 | A | * | 12/1964 | McCrossen | 296/183.1 |
| 3,578,213 | A | * | 5/1971 | Clarke et al. | 222/95 |
| 3,756,469 | A | * | 9/1973 | Clark et al. | 222/105 |
| 3,980,196 | A | * | 9/1976 | Paulyson et al. | 220/1.5 |
| 4,046,689 | A | * | 9/1977 | Argyll | 71/12 |
| 4,054,226 | A | * | 10/1977 | Bjelland et al. | 220/1.6 |
| 4,082,672 | A | * | 4/1978 | Petroski | 210/205 |
| 4,189,386 | A | * | 2/1980 | Aman | 210/235 |
| 4,200,535 | A | * | 4/1980 | Kennedy, Jr. | 210/241 |
| 4,414,335 | A | * | 11/1983 | Kipp, Jr. | 435/290.4 |
| 4,426,020 | A | * | 1/1984 | Presseau et al. | 222/108 |
| 4,453,645 | A | * | 6/1984 | Usui et al. | 220/530 |
| 4,461,402 | A | * | 7/1984 | Fell et al. | 222/105 |
| 4,523,936 | A | * | 6/1985 | Disanza, Jr. | 55/429 |
| 4,541,765 | A | * | 9/1985 | Moore | 414/267 |
| 4,671,733 | A | * | 6/1987 | Krein | 414/809 |
| 4,871,454 | A | * | 10/1989 | Lott | 210/205 |
| 4,929,353 | A | * | 5/1990 | Harris | 210/237 |
| 4,944,873 | A | * | 7/1990 | Williams | 210/209 |
| 5,021,156 | A | * | 6/1991 | Sloan | 210/241 |
| 5,024,346 | A | * | 6/1991 | Roser | 220/9.1 |
| 5,098,364 | A | * | 3/1992 | Schilling | 493/200 |
| 5,110,005 | A | * | 5/1992 | Schilling | 220/495.08 |
| 5,156,749 | A | * | 10/1992 | Williams | 210/770 |
| 5,183,086 | A | * | 2/1993 | Fanta et al. | 141/10 |
| 5,312,162 | A | * | 5/1994 | Baebel | 298/1 B |
| 5,336,408 | A | * | 8/1994 | Tsutumi | 210/384 |
| 5,553,980 | A | * | 9/1996 | Podd | 406/38 |
| 5,589,081 | A | * | 12/1996 | Harris | 210/804 |

(Continued)

*Primary Examiner* — Robert James Popovics
(74) *Attorney, Agent, or Firm* — Lawrence E. Lambelet, Jr.

(57) ABSTRACT

A settling tank for dewatering a thin slurry is provided in a lined portable container and with a disposable filtering means. A novel method of processing the slurry by settlement of the solid phase and removal of the liquid phase in cycles avoids the clogging of the filtering means. The settling tank can be easily transported and dumped without requiring the transferring of residue sludge or the cleaning of equipment.

9 Claims, 5 Drawing Sheets

U.S. PATENT DOCUMENTS

| | | | |
|---|---|---|---|
| 5,595,654 A * | 1/1997 | Caughman, Jr. | 210/323.1 |
| 5,597,732 A * | 1/1997 | Bryan-Brown | 435/290.4 |
| 5,624,049 A * | 4/1997 | Kovash et al. | 220/1.5 |
| 5,681,460 A * | 10/1997 | Caughman, Jr. | 210/232 |
| 5,707,535 A * | 1/1998 | Harris | 210/804 |
| 5,741,208 A * | 4/1998 | Moak | 493/195 |
| 5,746,862 A * | 5/1998 | Derby | 156/198 |
| 5,776,567 A * | 7/1998 | Schilling et al. | 428/34.5 |
| 5,803,531 A * | 9/1998 | Nielsen | 296/184.1 |
| 5,858,226 A * | 1/1999 | Caughman, Jr. | 210/232 |
| 5,975,642 A * | 11/1999 | Dibble et al. | 298/17 R |
| 5,983,957 A * | 11/1999 | Erickson | 141/7 |
| 6,004,461 A * | 12/1999 | Harris | 210/241 |
| 6,067,900 A * | 5/2000 | Lackner et al. | 100/111 |
| 6,146,528 A * | 11/2000 | Caughman et al. | 210/236 |
| 6,258,268 B1 * | 7/2001 | Lake | 210/238 |
| 6,281,001 B1 * | 8/2001 | McNelly | 435/262 |
| 6,364,122 B1 * | 4/2002 | Massey | 210/455 |
| 6,627,434 B1 * | 9/2003 | McNelly | 435/290.1 |
| 6,911,145 B2 * | 6/2005 | Hutchinson et al. | 210/258 |
| 6,977,038 B2 * | 12/2005 | Jowett | 210/220 |
| 7,045,068 B2 * | 5/2006 | Hutchinson et al. | 210/808 |
| 7,195,707 B2 | 3/2007 | Ruppel | |
| 7,288,192 B2 * | 10/2007 | Jowett | 210/220 |
| 7,410,576 B2 * | 8/2008 | Brouillard et al. | 210/241 |
| 7,429,319 B2 * | 9/2008 | Davis | 210/121 |
| 7,494,586 B2 * | 2/2009 | Mickelson et al. | 210/195.3 |
| 7,635,434 B2 * | 12/2009 | Mickelson et al. | 210/710 |
| 7,682,509 B2 * | 3/2010 | Murray et al. | 210/241 |
| 2004/0011749 A1 * | 1/2004 | Hutchinson et al. | 210/808 |
| 2004/0079691 A1 * | 4/2004 | Jowett | 210/220 |
| 2005/0184000 A1 * | 8/2005 | Jowett | 210/220 |
| 2006/0011561 A1 * | 1/2006 | Brouillard et al. | 210/767 |
| 2007/0034578 A1 * | 2/2007 | Brouillard et al. | 210/767 |
| 2007/0163938 A1 * | 7/2007 | Davis | 210/241 |
| 2007/0170119 A1 * | 7/2007 | Mickelson et al. | 210/724 |
| 2007/0193930 A1 * | 8/2007 | Marsh et al. | 210/121 |
| 2008/0023387 A1 * | 1/2008 | Harris | 210/205 |
| 2008/0179240 A1 * | 7/2008 | Kauppi et al. | 210/602 |
| 2009/0314715 A1 * | 12/2009 | Conwell | 210/650 |
| 2010/0206817 A1 * | 8/2010 | Dieziger | 210/745 |

* cited by examiner

PORTABLE SETTLING AND DEWATERING TANK

CROSS-REFERENCE TO RELATED APPLICATIONS

This application claims priority to Provisional Application 61/153,501, filed Feb. 18, 2009, which is incorporated herein by reference.

FIELD OF THE INVENTION

This invention relates to liquid-solid separation, and more particularly to dewatering thin slurry.

BACKGROUND OF THE INVENTION

There are circumstances where disposing of a slurry comprised of water and debris requires a separation of the liquid and solid phases. Such a circumstance occurs when vehicles used in dirty operations, such as construction or fire-fighting, and particularly in operations where there is an exposure to contaminants, are washed in a post-service cleanup. Commonly, the collected debris is comprised of mud, but may also comprise a suspended element which is harmful to life or to the environment. Accordingly, the solids in the slurry must be separated for safe disposal. Even if hazard is not an issue, it would be desirable for cost purposes to avoid transporting the water weight to a disposal site.

The cleaning process may occur over a mat or a containment system that collects the runoff water and debris. The slurry is then pumped from the mat to a settling tank to allow separation by gravity. The sludge that precipitates is then shoveled into sand bags, which are loaded onto pallets and evacuated by fork lift and truck transport to a land fill. The process, wherein bags of up to fifty pounds are loaded and lifted by hand, is labor intensive and prone to back injuries.

When the washing is done in a backwoods location, for example, both access and expense are involved in bringing a rough terrain fork lift to the location.

A portable settling tank offers an advantage in such a case because transferring the sludge in sand bags can be avoided. The portable tank would be moved directly to the land fill site after a dewatering process on location. U.S. Pat. No. 4,929,353 to Harris and U.S. Pat. No. 5,595,654 to Caughman both disclose portable dewatering tanks. In both Harris and Caughman, a filter medium is supported by a structure internal to the tank which is designed to create a cavity for drainage around the structure. Dewatering involves draining the filtrate from the cavity. When transported to the disposal site, the sludge must be removed from the structure and cleaned along with the tank. In the case of Caughman, the filter medium must also be cleaned.

The present invention is directed to an improvement in the art of portable settling tanks, wherein a thin slurry may be efficiently separated into liquid and solid components, and the resulting residue removed by dumping the contents of the tank in a manner where no cleaning is required.

SUMMARY OF THE INVENTION

It is accordingly an object of the present invention to substantially avoid labor in the disposal of the end products of dewatering a thin slurry.

It is a further object of the present invention to provide an apparatus for dewatering a thin slurry which substantially avoids any terminal cleanup.

It is a further object of the present invention to accomplish dewatering in the same container in which the residue of dewatering will be transported for disposal.

It is a further object of the present invention to provide a disposable liner for a portable container to shield the container from soil and contamination.

It is a further object of the present invention to provide a disposable porous percolation field for the filtrate product of dewatering.

It is a further object of the present invention to provide a disposable filtration medium.

It is a further object of the present invention to provide a method of dewatering which allows the cyclical addition of slurry to amass the residue.

It is a further object of the present invention to provide a method of dewatering which substantially avoids clogging the filtration medium.

These objects, and others to become hereinafter apparent, are embodied in a settling tank for dewatering slurry, comprising a portable open-top container having a bottom and four sides, a disposable watertight liner covering the bottom and the four sides, a layer of disposable coarse granular material with interstitial space therein covering the bottom of the watertight liner, a disposable filter cloth covering the coarse granular material and the liner, and a drain port through the liner into the interstitial space. The slurry containing particulate is pumped into the container through the open top, the action of settlement then separates relatively clean water from settled particulate, and the relatively clean water is removed through the open top by pumping to make room for more slurry until a preferred buildup of settled particulate is achieved. The settled particulate is ultimately dewatered by pumping out the filtrate, or allowing it to drain by gravity means, through the drain port.

In a particularly preferred embodiment, the container is a roll-on container. In another particularly preferred embodiment, the coarse granular material is river rock. In still another particularly preferred embodiment, the preferred buildup of settled material is is signaled by slurry appearing in the relatively clean water effluent.

An alternate embodiment provides a method of dewatering slurry. The method comprises the steps of providing a portable open-top container having a bottom and four sides, covering the bottom and four sides with a disposable watertight liner, covering the bottom of the liner with coarse granular material having interstitial space therein, layering a disposable filter cloth over the coarse granular material and the liner, and providing a drain port through the liner into the interstitial space. The method further comprises pumping slurry containing particulate into one end of the container through the open top, whereby settlement produces relatively clean water at the top of the container and settled particulate at the bottom, and filtering through the filter cloth produces a filtrate in the interstitial space. The method further comprises using a means for reducing water in the slurry while substantially avoiding clogging of the filter cloth, whereby room is provided for the cyclical addition of more slurry. The final steps include draining any remaining separated water through the drain port, transporting the container and its residual contents to a disposal site, and discarding the liner, coarse granular material, filter cloth and residue by dumping the contents to leave the container in its original state.

In a particular alternate embodiment, the means for reducing water while substantially avoiding clogging comprises pumping the relatively clean water off the top at the opposite end in cycle with the addition of slurry until a predetermined buildup of settled particulate has been achieved. The means further comprises avoiding the application of suction in the drainage of the filtrate, thereby avoiding packing of the settled particulate is against the filter cloth, other than by means of gravity alone.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein.

DETAILED DESCRIPTION OF THE PREFERRED EMBODIMENT

Figure 1:
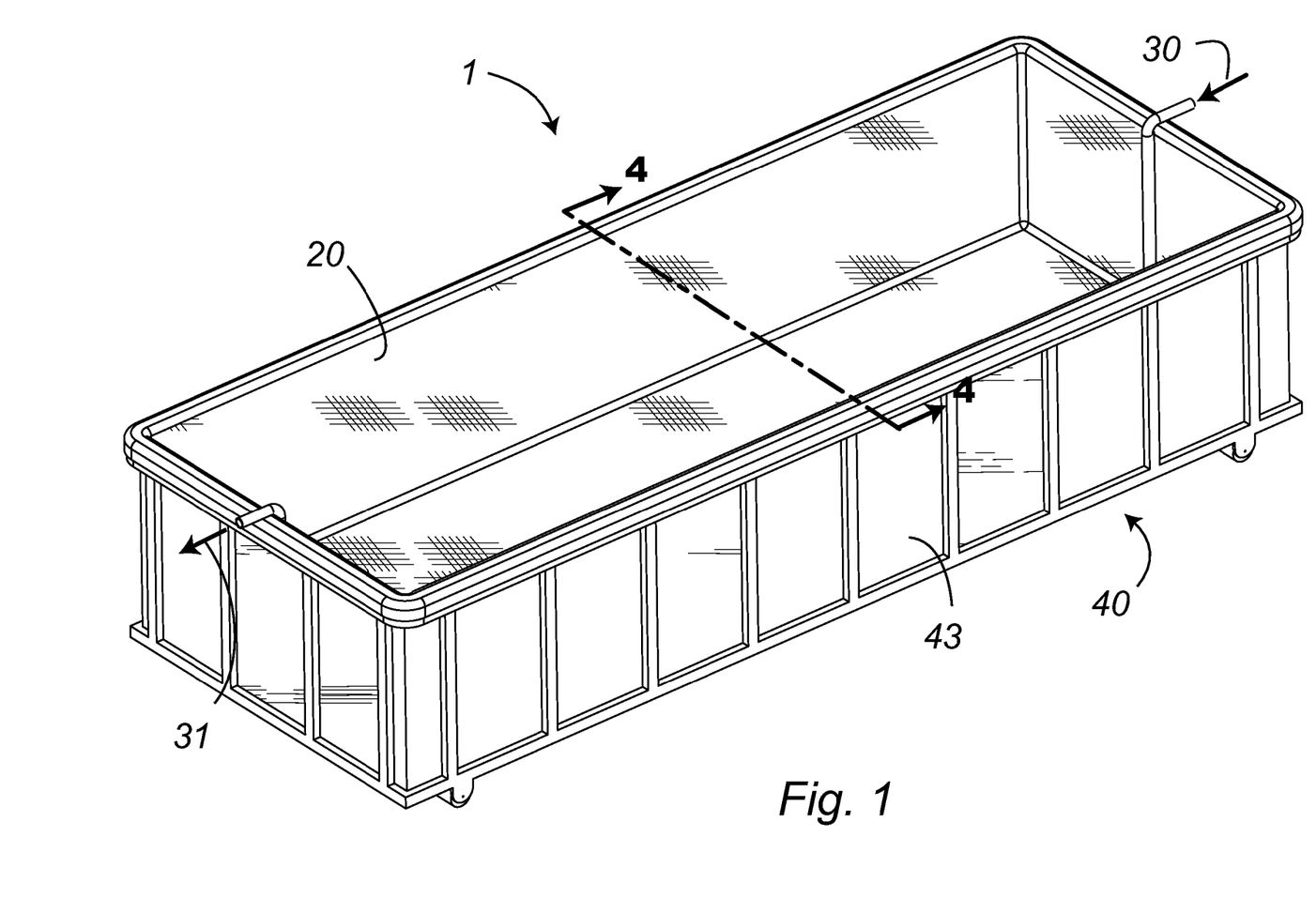
FIG. 1 is a perspective view of the present invention.

FIG. 1 shows a settling tank 1 of the present invention in an assembled configuration. The constituent components are best shown in the exploded view of FIG. 2. The portable settling tank 1 is comprised of a portable open-top container 40, a disposable watertight liner 3, a disposable coarse granular material 10, a disposable filter cloth 20, and a drain port 2.

Figure 4:
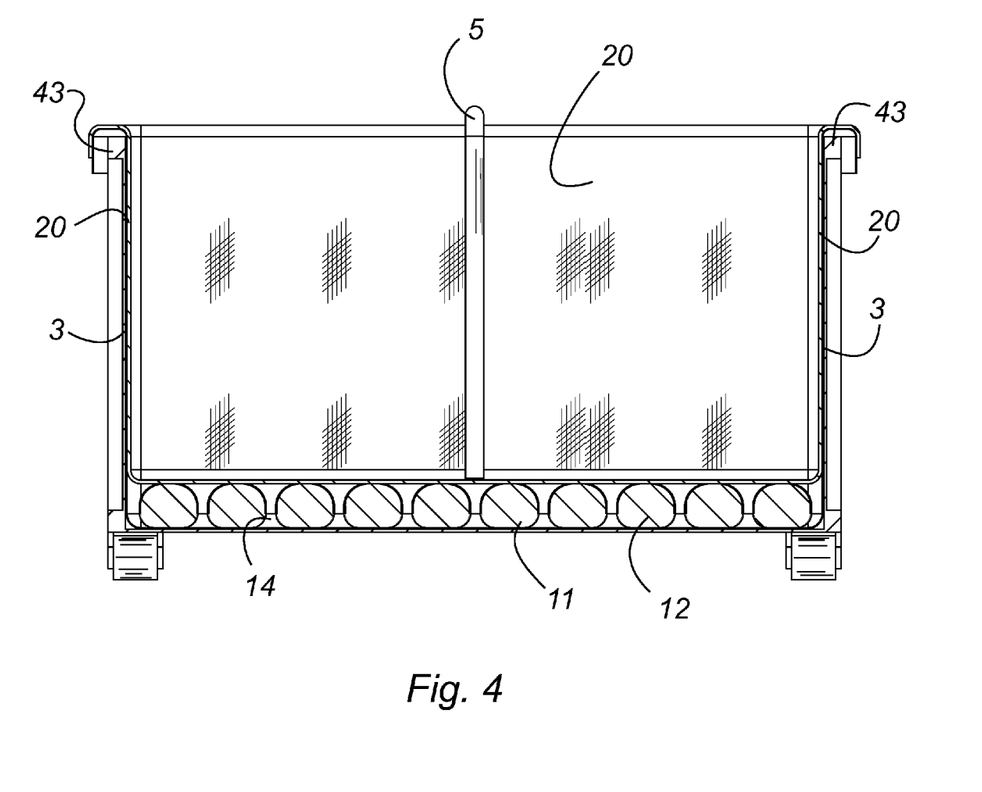
FIG. 4 is a sectional view taken along the line 4-4 in FIG. 1.

The cross-section view of FIG. 4 shows how the components are layered and overlapped to form a vessel for receiving a thin slurry 30. The slurry 30, comprised of particulate 32 (not shown) suspended in water, is introduced by pump action into the vessel through a deeply-drafted inlet port 5. The particulate 32 settles therein by gravity segmentation to leave a floating layer of substantially clean water 31. Filtration through the filter cloth 20 into an interstitial space 14 in the coarse granular material 10 results in a filtrate 22 (not shown), which is also substantially void of particulate 32. Filtrate 22 is removed by pump or gravity action through the drain port 2. Clean water 31 is removed by pump action through a shallowly-drafted exit outlet port 6. The resulting residue, consisting essentially of dewatered particulate 32, is discarded along with all contents of the vessel, including the watertight liner 3, the coarse granular material 10, and the filter cloth 20. The watertight liner 3 assures that the open-top container 40 is left in its original state and precludes any need for cleaning or decontamination.

Figure 2:
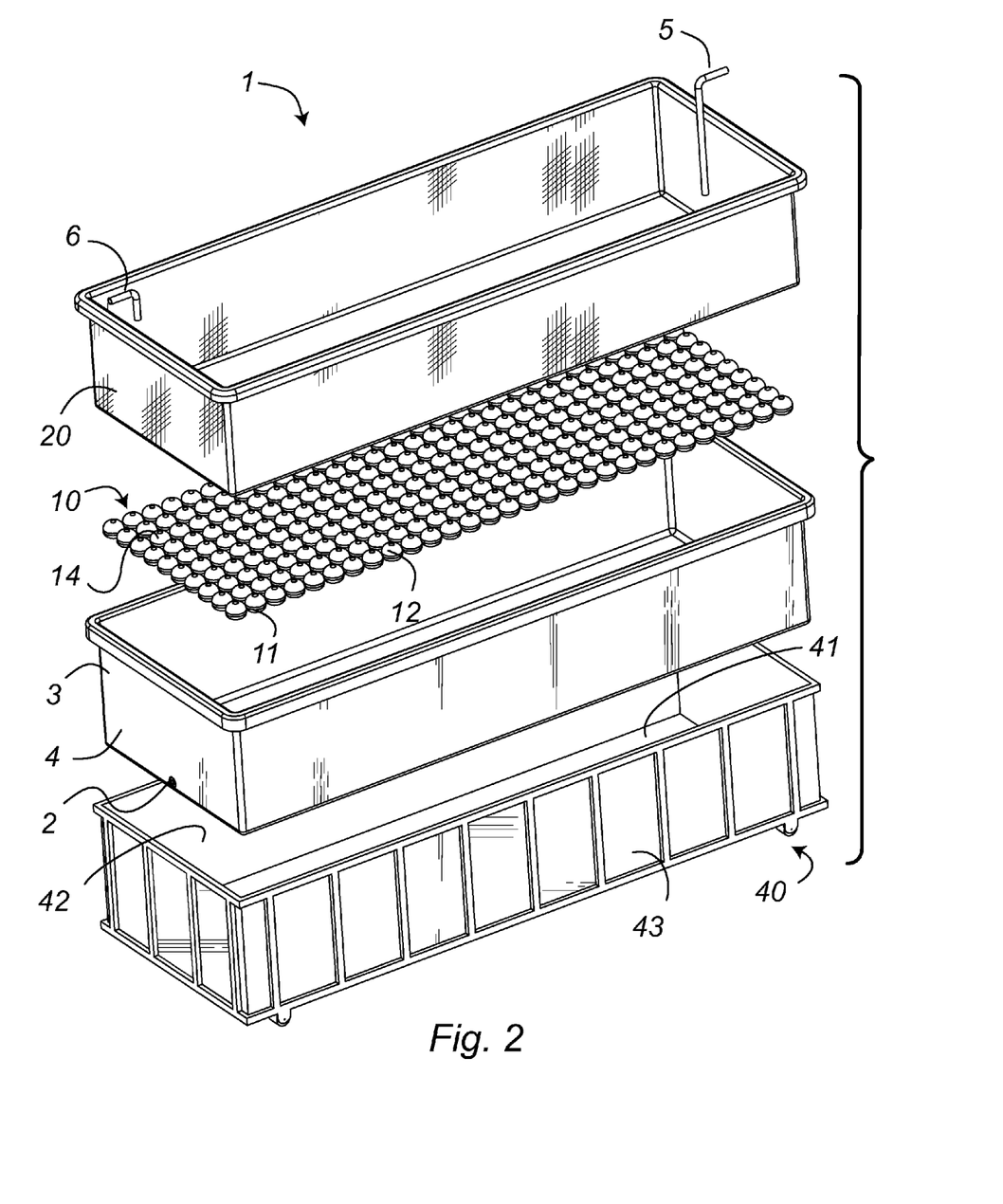
FIG. 2 is an exploded perspective view.

Referring to FIG. 2, portable open-top container 40 has a bottom 41 and four sides 42 enclosing a volume. The volume may be of any size appropriate for the amount of slurry to be processed. In the preferred embodiment, the volume is defined by the dimensions is of 22 feet long by eight feet wide by four and a half feet deep. While any portable rigid or semi-rigid container is suitable, preferably the open-top container 40 is a roll-on waste container 43, typically available by rental from a local waste-disposal company. Because the open-top container 40 is portable, a transportation means for hauling purposes is also comprehended.

The watertight liner 3 is draped over the bottom 41 and four sides 42 of the open-top container 40 to shield the interior surfaces of the container. The watertight liner 3 may lap over the top edges of the container, or otherwise be fixed thereto, so that the liner cannot be caused to expose the interior surfaces. The watertight liner 3 is preferably a film with a gauge of 5-10 mils. While any waterproof film is suitable, a preferred choice would be one of bio-degradable or recycled resin composition, in order of preference. The preferred resins are those comprising polyethylene, polypropylene, or a mixture thereof, or polyolefin, which may be a blend of those resins.

A layer of coarse granular material 10 is laid over the bottom of the watertight liner 3 to effectively provide a reservoir for drainage by means of interstitial space 14. Interstitial space 14 is comprised of all space within the boundaries of the layer which is not filled with the material of the coarse granular material 10. Preferably, the layer is 6-12 inches in depth, but may be any depth consistent with the volume of drainage desired. The coarser the consistency, the larger the interstitial space 14 for a given volume of the layer; consequently, therefore, coarsening provides a means for optimization. The coarse granular material 10 may be anything disposable which has the property of maintaining is interstitial space therein, as, for example, pine cones, or discarded bricks arrayed in a jumble. It may also be discarded old pallets, or broken up construction materials, although not granular in the same sense. In the preferred embodiment, the coarse granular material 10 is stones 11, and in a particularly preferred embodiment, the stones are river rock 12.

Figure 3:
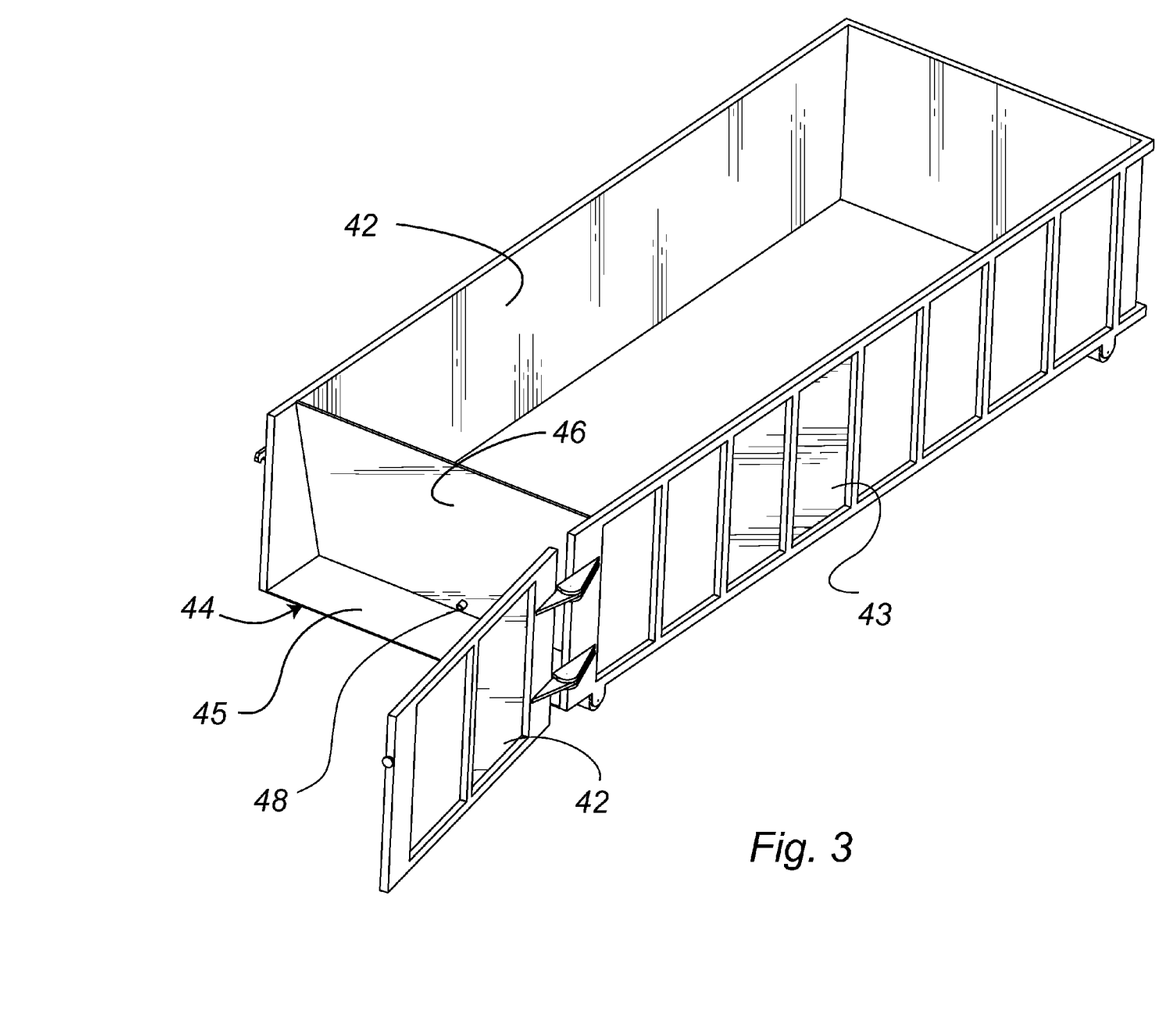
FIG. 3 is a perspective view of an alternative embodiment showing the tank with a false wall.

The drain port 10 vents the watertight liner 3 and ducts into the interstitial space 14 to drain said space. In the preferred embodiment, an intermittent pump provides the means for draining. The intermittent pump should be of a peristaltic, or otherwise of a self-priming, type because the pump may outstrip the flow of drainage. In an alternate embodiment, shown in FIG. 3, gravity may provide the means for draining. In order to facilitate this means, a side opening 44 is provided in at least one of the sides 42 to permit a gravity flow there through. In a particular alternate embodiment, the side opening 44 is a doorway 45, which may otherwise provide access to the interior of open-top container 40. If there is a door 47 in the doorway 45, and if there are gaps around the periphery thereof, the gaps may present sufficient opening for leaching purposes. Otherwise, a false wall 46 may be constructed adjacent to the doorway 45 to function as a supporting wall and prevent collapse of the vessel when door 47 is positioned open. False wall 46 may have an aperture 48, which is in fluid communication with the drain port 2, to facilitate gravity drainage. False wall 46 may be guyed to one or more sides 42 by rope or cabling to thereby support it upright. It is intended that false wall 46 be discarded with the contents of the open-top container 40. False wall 46 may be comprised, for example, of an old sheet of plywood.

The disposable filter cloth 20 is draped over the watertight liner 3 and the layer of coarse granular material 10. The filter cloth 20 may lap over the top edges of the container, or otherwise be fixed proximate thereto, so that the filter cloth remains at all times above the liquid surface level. The filter cloth 20 is a woven or nonwoven textile having a sieve matched to the tiniest allowable particle in the filtrate. In the preferred embodiment, the filter cloth 20 is a geotextile cloth, or equivalent, fabricated with polyester or polypropylene yarns, or, otherwise laid up with polypropylene fibers. Such a material is sometimes used in road construction or for environmental stabilization. The preferred sieve size is in the 100-200 micron range, and a particular preference requires 150 microns or less to trap seeds.

The filter cloth 20 is designed to substantially trap the particulate 32 and separate it from the filtrate 22 by filtering action. This filtering action may or may not be assisted by pump suction through the drain port 2. Applying pump suction before the particulate 32 has had a chance to naturally settle, however, might clog the filter cloth 20 prematurely by driving particles into the pores of the cloth. In a similar way, slurry maintained at full tank capacity, or in other words, with a full "head", would hydraulically pressurize the sediment layer on the bottom. A means for reducing water in the slurry while substantially avoiding clogging of the filter cloth 50 (FIG. 5), hereinafter "a means for reducing water 50", therefore, would comprise the procedural steps of adding the slurry 30 and pumping the clean water 31 in staggered cycles that would result in minimizing the head. A staggered cycle would involve, for example, pumping in slurry, waiting for is settlement to vacate a thin top layer, and then pumping clean water out of the thin top layer. The means for reducing water 50 would further comprise cyclically pumping the filtrate 22 to maintain the filtrate level just above the bottom of the filter cloth 20; or, otherwise, allowing gravity drainage of the filtrate 22. These cyclical steps of pumping, both of clean water and of filtrate, if applicable, would continue until a preferred buildup of settled particulate 33 (not shown) is achieved.

It is recognized that the stratification of particulate 32 within the pool of slurry 30 is in the form of a gradient, rather than discrete in the form of layers. That is to say, there is a distribution of particulate 32 decreasing from bottom to top over any relatively short period of time, such that a "clean" top layer is only an approximation. It is further recognized that the addition of more slurry 30 will inevitably disturb this distribution. The preferred means for reducing water 50, therefore, further comprises pumping in slurry at one end of the open-top container 40 and pumping out clean water at the opposite end. The preferred means still further comprises locating the distal end of the inlet port 5 at or near the top of the bottom settlement and the distal end of the outlet port 6 at or near the top of the clean water layer. As the bottom settlement collects over time and rises in level, the distribution will cause more and more of the particulate 32 to remain present in the clean water layer. When a recognizable amount of particulate is pumped out with the clean water, it is either a signal that the current pumping cycle is excessive; or, otherwise, that the preferred buildup of settled particulate 33 has been reached. The latter will be hallmarked by shorter and shorter pumping cycles. An amount of particulate 32 in the clean water 31 which is recognizable might be that is amount clogging a filter to the pump, for example. When the preferred buildup of settled particulate 33 has been reached, the pumping of filtrate 22 may proceed unrestricted until all water is substantially removed and an essentially dry residue remains.

Figure 5:
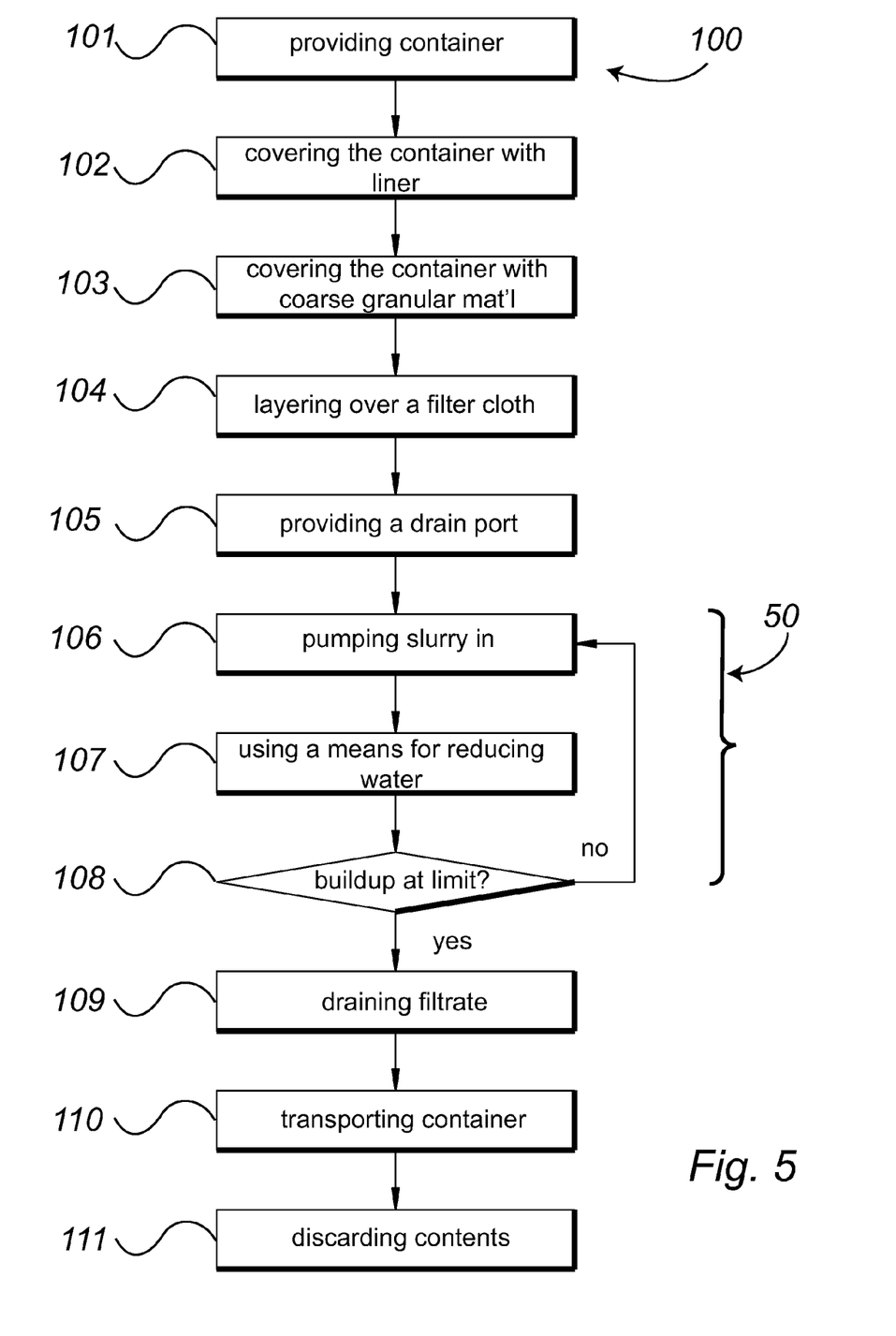
FIG. 5 is a process diagram showing a method of dewatering a slurry.

FIG. 5 shows an alternate embodiment, wherein a method for dewatering a slurry 100 comprises the following process:

STEP 101. Providing the portable open-top container 40 having the bottom 41 and four sides 42.

STEP 102: Covering the bottom 41 and the four sides 42 with the disposable watertight liner 3.

STEP 103: Covering the bottom of the watertight liner 3 with the coarse granular material 10 having the interstitial space 14 therein.

STEP 104: Layering the filter cloth 20 over the coarse granular material 10 and the watertight liner 3.

STEP 105: Providing the drain port 2 through the watertight liner 3 and into the interstitial space 14.

STEP 106: Pumping the slurry 30 containing the particulate 32 into one end of the open-top container 40 through the open top, whereby settlement produces relatively clean water 31 at the top of container and settled particulate at the bottom, and filtering through the filter cloth 20 produces the filtrate 22 in the interstitial space 14.

STEP 107: Using the means for reducing water 50, whereby room is provided for the cyclical addition of more slurry 30.

STEP 108: Deciding whether or not the preferred buildup of settled particulate 33 has been achieved; and, if not, repeating steps 106 and 107.

STEP 109: Draining any remaining filtrate 22 through the drain port 2.

STEP 110: Transporting the open-top container 40 and its residual contents to a disposal site.

STEP 111: Discarding the watertight liner 3, the coarse granular material 10, the filter cloth 20 and the residue by dumping the contents to leave the container in its original state.

It is to be understood that the invention is not limited in its application to the details of construction and to the arrangements of the components set forth in the preceding description or illustrated in the drawings. The means for reducing water 50 might be carried out by evaporation in place of pumping clean water, for example. Also, it is to be understood that the phraseology and terminology employed herein are for the purpose of the description and should not be regarded as limiting.

What is claimed is:

1. A method of dewatering slurry, comprising the steps of:
providing a portable, open-top container having a bottom and four sides;
covering the bottom and four sides of the container with a disposable watertight liner;
covering the bottom of the liner with coarse granular material having interstitial space therein;
layering a filter cloth over the coarse granular material and the liner;
providing a drain port through the liner and into the interstitial space;
pumping slurry containing particulate into one end of the container through the open top, whereby settlement produces relatively clean water at the top of the container and settled particulate at the bottom, and filtering through the filter cloth produces a filtrate in the interstitial space;
using a means for reducing water in the slurry while substantially avoiding clogging of the filter cloth, whereby room is provided for the cyclical addition of more slurry;
draining any remaining filtrate through the drain port;
transporting the container and its residual contents to a disposal site; and
discarding the liner, coarse granular material, filter cloth and residue by dumping the contents to leave the container in its original state.

2. The method of claim 1, wherein the means for reducing water while substantially avoiding clogging comprises pumping the relatively clean water off the top at the opposite end in cycle with the addition of slurry until a predetermined buildup of settled particulate has been achieved.

3. The method of claim 2, wherein the means for reducing water while substantially avoiding clogging further comprises avoiding the application of suction in the drainage of the filtrate, thereby avoiding packing of the settled particulate against the filter cloth other than by means of gravity alone.

4. The method of claim 3, wherein the predetermined buildup of settled particulate is signaled by slurry appearing in the relatively clean water effluent.

5. The method of claim 1, wherein the portable, open-top container is a roll-on waste container.

6. The method of claim 1, wherein the coarse granular material is comprised of stones.

7. The method of claim 1, wherein the disposable watertight liner is comprised of a film having a composition of polyethylene, polypropylene, polyolefin or a combination thereof.

8. The method of claim 1, wherein the filter cloth is a woven or nonwoven fabric.

9. The method of claim 8, wherein the woven or nonwoven fabric has a sieve size of 100-200 microns.

* * * * *